United States Patent [19]

Fry et al.

[11] Patent Number: 4,748,060
[45] Date of Patent: May 31, 1988

[54] FLEXIBLE PIPE COVERING SEAM SEALING

[75] Inventors: William F. Fry, Columbia; Joseph L. Giandalia, Lancaster; Rickie L. Sitler, Wrightsville, all of Pa.

[73] Assignee: Armstrong World Industries, Inc., Lancaster, Pa.

[21] Appl. No.: 946,768

[22] Filed: Dec. 29, 1986

[51] Int. Cl.$^4$ .................................. B29D 23/22
[52] U.S. Cl. ................... 428/36; 138/151; 138/156; 156/304.1; 428/40; 428/188
[58] Field of Search ................ 138/151, 156; 156/304.1, 304.2; 428/36, 40, 57, 58, 188, 192

[56] References Cited

U.S. PATENT DOCUMENTS

| | | | |
|---|---|---|---|
| 2,717,848 | 9/1955 | Jaye | 428/36 X |
| 2,849,028 | 8/1958 | Clark et al. | 428/36 |
| 3,204,668 | 9/1965 | Emerson, Jr. et al. | 428/316.6 X |
| 3,853,663 | 12/1974 | McGlashen | 156/304.2 |
| 3,963,546 | 6/1976 | Roberti | 428/36 X |
| 4,022,248 | 5/1977 | Hepner et al. | 428/36 X |
| 4,264,388 | 4/1981 | McClintock | 428/40 X |
| 4,576,846 | 3/1986 | Noel | 428/188 X |
| 4,584,217 | 4/1986 | McClintock | 428/41 X |
| 4,606,957 | 8/1986 | Cohen | 428/40 |
| 4,617,220 | 10/1986 | Ginster | 428/122 |
| 4,621,000 | 11/1986 | Frick | 428/122 X |

Primary Examiner—Henry F. Epstein

[57] ABSTRACT

A flexible pipe covering having a seam or split along its length is placed over a water or like pipe. The seam is sealed by the use of a pressure sensitive adhesive transfer tape which is factory mounted on one side of the seam and provides a protective sheet that is removed after the flexible pipe covering is mounted in position. Upon removing the protective sheet, the pressure sensitive adhesive will be made to contact both sides of the seam and seal the seam.

A similar type of adhesive joint may be formed at the butt end of two adjacent pipes.

2 Claims, 1 Drawing Sheet

FLEXIBLE PIPE COVERING SEAM SEALING

BACKGROUND OF THE INVENTION

1. Field of the Invention

The invention is directed to a flexible pipe covering or long tubular-shaped object which has a split or seam along its length and this seam is sealed by the use of a pressure sensitive adhesive.

2. Description of the Prior Art

U.S. Pat. No. 4,584,217 is directed to a pipe which is used for insulation purposes and a pressure sensitive adhesive with a protective sheet applied to an overlapping flap is used to seal the seam in the pipe after it is mounted in position.

With flexible insulation, it is known to apply in the field, after the pipe covering is mounted in position over a water or like pipe, a contact adhesive material by brushing to both sides of a seam in order to seal the seam.

SUMMARY OF THE INVENTION

An article for insulation or like purposes has a long tubular shape with a split along the length of the article. The slit forms a seam which has two abutting sides. An adhesive coating is positioned on at least one flat surface of the seam and a protective sheet overlays the adhesive and prevents the adhesive from bonding to the other surface of the seam. After the article is mounted in position over a water or like pipe, the protective sheet is removed and the adhesive coating fastens together the two sides of the seam.

A similar type of adhesive coating may be placed on the butt end of the article and two adjacent articles may be fastened together in position on a water or like pipe structure.

DESCRIPTION OF THE PREFERRED EMBODIMENTS

Figure 1:
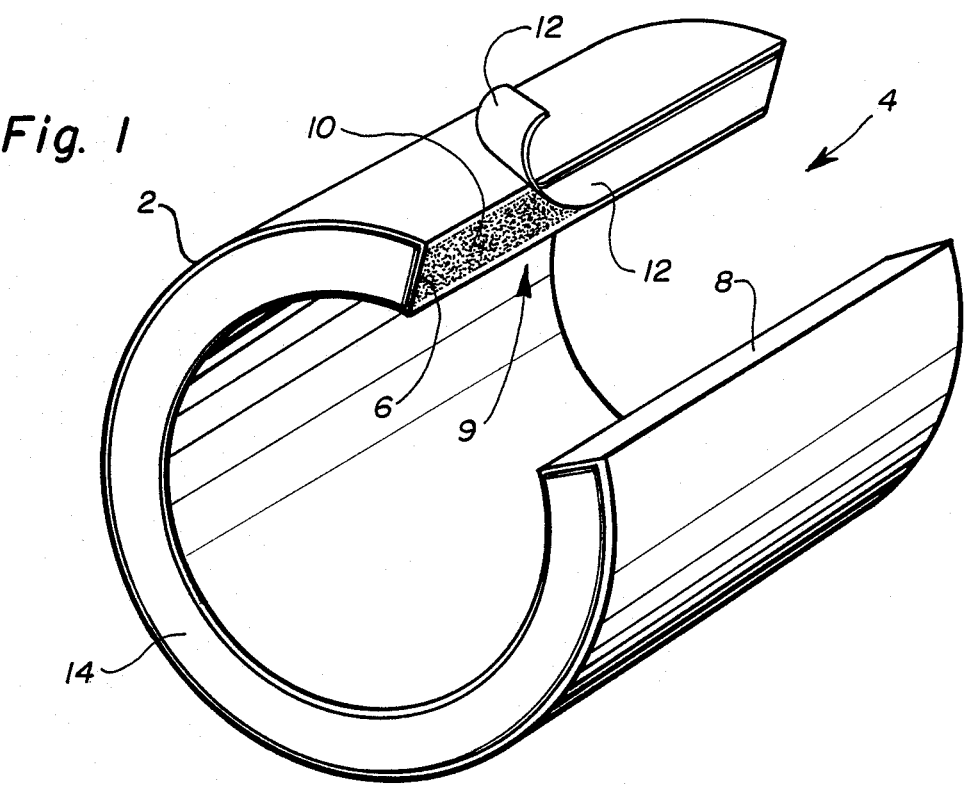
FIG. 1 is a perspective view of the invention in position on a flexible pipe; and, FIG. 2 is an end view of a flexible pipe with the end adhesive coating in position.

The article of FIG. 1 has a long tubular shape 2 with a longitudinal axis and a split or seam 4 in the wall of the article parallel to the longitudinal axis of the tube. The split extends all the way through one wall of the article and extends the full length of the tubular shape. The wall on either side of the split has flat surfaces 6 and 8 that abut together when the split is forced into a closed position. An adhesive transfer tape 9 with an adhesive coating 10 is applied to at least one of the flat surfaces. As shown in FIG. 1, it is applied to surface 6. A protective sheet 12 overlays the adhesive and prevents the adhesive from bonding to the other flat surface 8 of the split or seam to fasten the two flat surfaces together to force the seam into a closed position.

Figure 2:
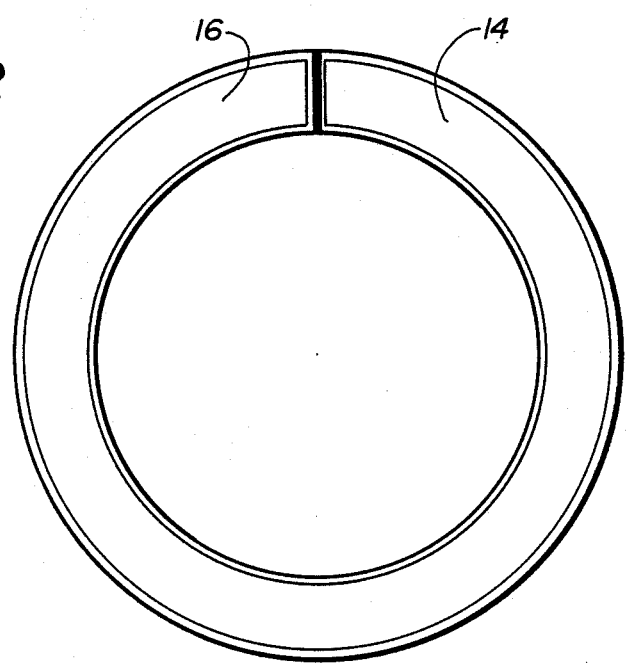

The article of FIG. 1 has a end which forms a flat surface 14. FIG. 2 shows the flat surface 14 and on that surface is positioned an adhesive 16 which is part of a transfer tape, which adhesive may contact the end of an adjacent article. FIG. 2 also shows the seam in a sealed position with the adhesive fastening together the two walls of the seam. The adhesive is provided on the protective sheet 12 and any pressure sensitive adhesive on a protective sheet may be used. Particularly, useful are the 3M adhesive transfer tapes 465, 920 and 950.

Adhesive may be provided in one continuous strip covering the total wall 6 or could be provided in plural strips along the wall 6. The adhesive can be provided on both walls 6 and 8 and both ends of the pipe. Other pressure sensitive adhesives may be used and the only requirement being that they bond together the particular material being used in the pipe covering.

The pipe covering is a flexible pipe covering and it is similar to that shown in U.S. Pat. No. 2,849,028.

The protective sheet 12 and the adhesive 10 is factory applied and the article is shipped with the adhesive and protective sheet in place to the job site. The protective sheet 12 prevents the adhesive from sticking to other articles or the wall 8 of the pipe covering. After the flexible pipe covering is slipped over a water or like type pipe that needs to be insulated, the protective sheet 12 is removed and the both walls 6 and 8 of the seam are pressed together and the adhesive bonds both surfaces together to form a water impervious seal.

The same type of adhesive may be formed into a disk shape and placed on the end of the pipe covering. The adhesive may be provided on one or both ends of the pipe covering and it is covered by a protective sheet. When the protective sheet is removed, then the butting ends of two adjacent pipe coverings may be pressed together to form a water impervious seal joining the two pipe coverings together.

What is claimed is:

1. An article having a long tubular flexible shape with an elongated axis and a split or seam in the wall of the tubular cross-section on only one side parallel to the axis, said split extending all the way through the wall of the tubular shape and extending the full length of the tubular shape, the wall either side of the split having flat surfaces that abut together when the split is forced into a closed position, comprising:
    (a) a pressure sensitive adhesive transfer tape having an adhesive coating being positioned on at least one flat surface at the split and a protective sheet overlying the adhesive and preventing the adhesive from bonding to the other flat surface of the split, said adhesive coating being the only means to fasten the two flat surfaces together to force the split into a closed position, and
    (b) a pressure sensitive adhesive transfer tape having an adhesive coating being positioned on the flat surface at the end of the tubular shape and a protective sheet overlying the adhesive and preventing the adhesive from bonding to a similar flat surface on a second long tubular shape article or any other surface.

2. The article of claim 1 wherein a first and a second long tubular shape article are positioned on a common axis located within the tubular shape and the articles are fastened together, comprising:
    (a) said flat surface at the end of at least one tubular shape having the pressure sensitive adhesive coating no longer covered by the protective sheet and the flat surfaces at the ends of the two abutting articles are bonded together by the pressure sensitive adhesive coating, and
    (b) said flat surface at the split having the pressure sensitive adhesive coating no longer covered by the protective sheet and the flat surfaces at either side of the split being fastened together by the pressure sensitive adhesive coating to force the split into a closed position.

* * * * *